United States Patent [19]

Duan et al.

[11] Patent Number: 5,006,632

[45] Date of Patent: Apr. 9, 1991

[54] PROCESS FOR PREPARING HEAT RESISTING HYDROBENZOIC ACID SERIES POLYESTERS WITH HIGH DEGREE OF POLYMERIZATION

[75] Inventors: Renxian Duan, Chengdu; Chengjiu Peng, Fushun; Guijiang Tian, Beijing, all of China

[73] Assignee: The First Branch of Chenguang Research Institute of Chemical Industry, Sichuan, China

[21] Appl. No.: 431,551

[22] Filed: Nov. 3, 1989

[30] Foreign Application Priority Data

Nov. 5, 1988 [CN] China .............................. 88109743.8

[51] Int. Cl.$^5$ ..................... C08G 63/06; C08G 65/38
[52] U.S. Cl. ................................... 528/206; 528/176; 528/179; 528/207
[58] Field of Search ................. 528/176, 179, 206, 207

[56] References Cited

U.S. PATENT DOCUMENTS

| | | | |
|---|---|---|---|
| 4,075,173 | 2/1978 | Maruyama et al. | 528/206 |
| 4,661,579 | 4/1987 | Blocker | 528/170 |
| 4,745,167 | 5/1988 | Iizuka et al. | 526/262 |
| 4,746,708 | 5/1988 | Sybert | 525/392 |
| 4,864,013 | 9/1989 | Kageyama et al. | 528/220 |
| 4,910,284 | 3/1990 | Hijikata et al. | 528/206 |
| 4,920,197 | 4/1990 | Hayashi et al. | 528/190 |

*Primary Examiner*—Harold D. Anderson
*Assistant Examiner*—T. Mosley
*Attorney, Agent, or Firm*—Fish and Richardson

[57] ABSTRACT

This invention provides a process for preparing hydroxybenzoic acid polyester resins with a high degree of heat resistance and a high degree of polymerization, and is characterized in that: with the aid of intermediate transformation of phenol and by means of esterification, polyester can directly be obtained by polycondensation from the only starting material hydroxybenzoic acid. The transfer medium phenol existing in the distillates mixture can directly and repeatedly be used without any compensation. The product obtained in this invention is low cost, having a high degree of polymerization, 80–90% yield and in less than 1 hr, with 3% weight loss percentage at 400° C. It can be used for various industrial and engineering purposes wherever heat-resistant, abrasion-resistant, self-lubricating, good heat conducting, dielectric, solvent and radiation resisting properties are required.

8 Claims, No Drawings

PROCESS FOR PREPARING HEAT RESISTING HYDROBENZOIC ACID SERIES POLYESTERS WITH HIGH DEGREE OF POLYMERIZATION

FIELD OF INVENTION

This invention provides a process for preparing hydroxybenzoic acid-based polyester resins having a high degree of polymerization. From the starting material hydroxybenzoic acid only, with the aid of the intermediate transformation of phenol and by means of esterification, the said product can directly be obtained by polycondensation.

BACKGROUND

More specifically, the hydroxybenzoic acid polyester resins of this invention are made of parahydroxybenzoic acid, the most useful one among the orth-, meta-, and paraisomers. The full name of this polyester is poly (phenyl p-hydroxybenzoate) or simply polybenzoate. Poly (phenyl p-hydroxybenzoate) is a wholly aromatic linear high polymer. The main chain of this high polymer consists of p-oxybenzoyl repeating units. The structural formula is as follows:

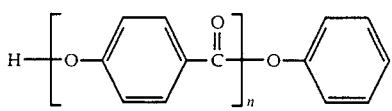

n represents degree of polymerization. According to this invention, the value of n can reach 200–500. This high polymer has outstanding heat resistance and can be used at 300° C. for a long period of time, besides it also has a series of other excellent properties such as abrasion resistance, self-lubrication, good heat conduction, dielectric properties, solvent resistance and radiation resistance. It is a special engineering plastic developed in the 1970's and can be used in various industrial and engineering fields wherever the above properties are required. From the viewpoint of the main chain structure, polybenzoate can be regarded as a homopolyester of the bifunctional p-hydroxybenzoic acid, however it was apparent from earlier research data that no high polymer could obtained from homocondensation of p-hydroxybenzoic acid because of the insufficient reactivities of the phenolic hydroxyl and carboxyl groups affected by the benzene ring, and when the temperature is raised to higher than 200° C., p-hydroxybenzoic acid will readily undergo thermal decomposition and decarboxylation. In order to raise the reactivities of hydroxyl and carboxyl groups in p-hydroxybenzoic acid, various approaches have been used such as acetylation of the hydroxyl group, esterification of the carboxy group with aliphatics and acylhalogenation of the carboxyl group before polycondensation. But all these methods could hardly be used in practical production. Some of them only gave product with a low degree of polymerization and insufficient heat-resistance, while others suffered from many side reactions and serious corrosion problems. A formable and machinable polybenzoate with number average molecular weight around 10,000 (degree of polymerization near 100) and good properties was first successfully produced by American Carborundum Co. in 1967. The technical line pursued was esterification of the carboxyl group with phenol to prepare phenyl p-hydroxybenzoate and then polycondensation. The reaction formula is:

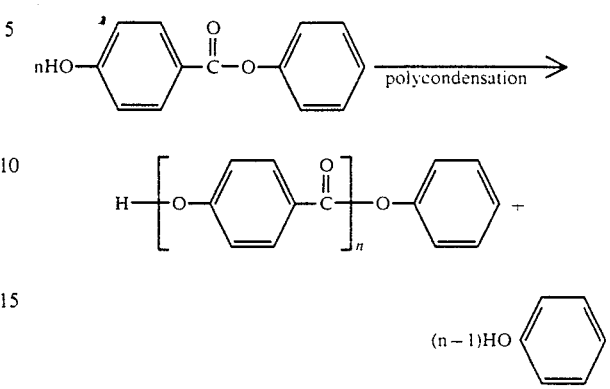

The reasons for the success of using phenyl p-hydroxybenzoate as monomer for polycondensation are as follows: the reactivity is significantly raised as the H atom of the carboxyl group in hydroxybenzoic acid is substituted by the benzene ring; the decarboxylation can be suppressed since the carboxylic group is covered owing to the steric hindrance of benzene ring and also due to the high bond energy of the benzene ring. The heat-resistance of the high polymer will be better with hydroxyl group at one end and phenyloxy group at the other. Therefore up to now this technical line has been the principal practical line in this regard. There are several methods for preparing the polycondensation monomer phenyl p-hydroxybenzoate. Those that have been disclosed are:

1. P-hydroxybenzoic acid undergoes ester exchange reaction with phenylacetate (Fr. Pat. 1.568.152)

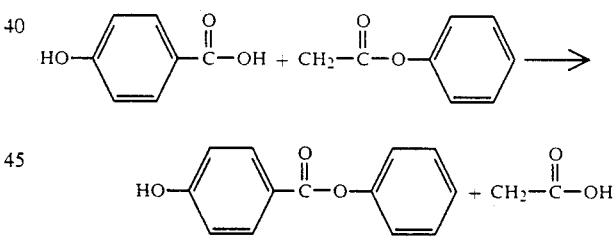

2. P-hydroxybenzoic acid undergoes similar ester exchange reaction with diphenyl carbonate (Jap. Pat. Appl. Laid Open No. 48-37,355)

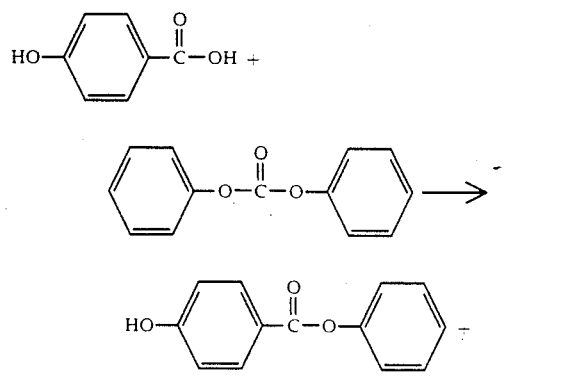

-continued

3. P-hydroxybenzoic acid undergoes esterification directly with phenol (Jap. Pat. Appl. Laid Open No. 47-39,048)

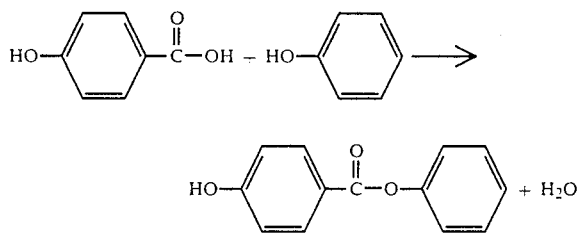

Because of the very high price of phenylacetate and the need of gaseous HCl catalyst the production cost of method 1 is very high. Diphenylcarbonate used in method 2 is cheaper, nevertheless the input of diphenylcarbonate according to the mole ratio will be significantly increased owing to its high molecular weight, with the consequence that the production cost of method 2 is still very high. The phenol used in method 3 is much cheaper, and very high yield of phenyl p-hydroxybenzoate can conveniently be obtained in the presence of acid catalyst. Besides, the byproduct water is easy to handle, hence method 3 is a more favorable one.

After the formation of phenyl p-hydroxybenzoate, due to its high reactivity its oligomer is readily formed. Therefore, it will be difficult to separate and purify phenyl p-hydroxybenzoate from the reaction mixture by distillation. Recrystallizing or washing method is often used to separate and purify phenyl p-hydroxybenzoate before polycondensation (i.e. two step technique). Both the ester exchange methods of phenylacetate and of diphenyl carbonate had been successful one step techniques and were granted the related patents respectively. The one step technique means the reaction mixture can directly be used for polycondensation and need not to be separated and purified for the monomer. However, because of the difficulty in eliminating thoroughly the acid catalyst and other matters, the monomer mixture obtained from direct esterification of phenol (i.e., method 3) could not be used without purification for polycondensation; and up until 1981, it was still believed that the one step method would appreciably affect the polycondensation rate, and as a result polyester of a high degree of polymerization could hardly be obtained which led to the fact that the two step method was still in use, and with the addition of a special alkali metal compound polyester was produced (Jap. Pat. Appl. Laid Open 56-90-029). Hence up to now nobody has ever been successful in a one step technique by pursuing the above-mentioned technical line (i.e., method 3).

One purpose of this invention is to find out whether polyester with a high degree of polymerization can be produced directly from the monomer phenyl p-hydroxybenzoic acid prepared by reaction of p-hydroxybenzoic acid with phenol without further separation and purification.

Another purpose of this invention is to find out whether phenol, the by-product formed during polycondensation of hydroxyphenyl benzoate, can very simply be reused in the next esterification to form a new monomer phenyl hydroxybenzoate.

The last purpose and also the final goal of this invention is to find out the possibility of establishing a phenol recycling reaction system provided that the above two purposes have been realized. If it is possible, then hydroxybenzoic acid polyester resins of a high degree of polymerization can be obtained directly from the only starting material, hydroxybenzoic acid (i.e., the only reagent which must be replenished). This research problem having strong competitive potentiality in cost is very important and its solution has never been achieved by anyone before.

SUMMARY OF THE INVENTION

According to this invention, a process for preparing hydroxybenzoic acid-based polyester resins with a high degree of heat resistance and a high degree of polymerization, comprising:

(1) preparing phenyl hydroxybenzoate monomer by esterifying hydroxybenzoic acid with an excess amount of phenol, (2) distilling the reaction mixture to remove phenol and water;

(3) discarding the water;

(4) polymerizing the monomer by polycondensation to form the polyester resin;

(5) distilling off the phenol generated as a byproduct of the polycondensation reaction and combining it with the phenol distillates collected after the esterification reaction; and (6) combining all the phenol distillates with additional hydroxybenzoic acid to prepare additional monomer for further polycondensation reaction to produce polyester.

DETAILED DESCRIPTION OF THE INVENTION

The substantial technology related to this invention includes:

(1) Under what conditions should esterification of hydroxybenzoic acid with phenol take place and be completed polycondensation?

(2) Under what conditions should the above-mentioned monomer be transferred and the polycondensation completed to form the polyester?

(3) How to carry out the post-treatment most effectively to get the said polyester?

(4) How to establish and maintain the recycling transformation system of the transferring medium phenol in order to realize the set goal of preparing the said polyester directly from the only starting material, hydroxybenzoic acid?

Take hydroxybenzoic acid and phenol as an example, this transformation process can be expressed in the following equation:

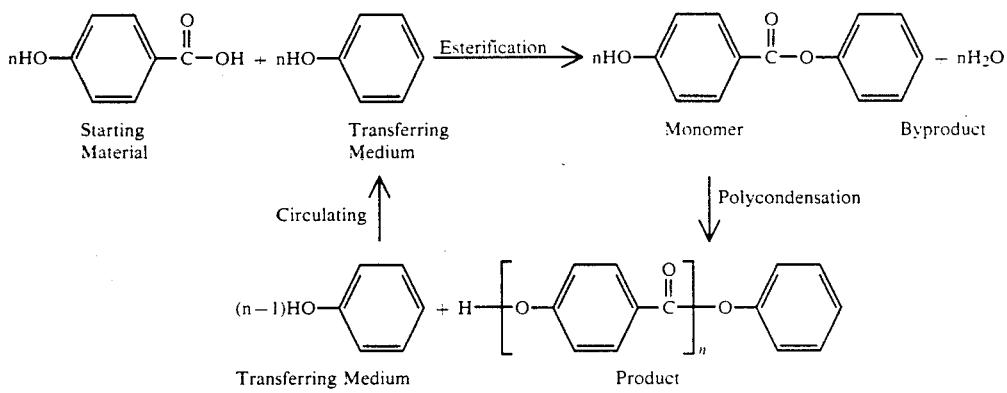

| | | | |
|---|---|---|---|
| Starting Material | Transferring Medium | Monomer | Byproduct |

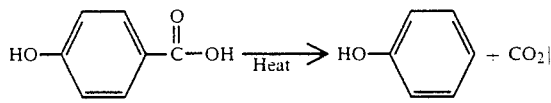

| | |
|---|---|
| Transferring Medium | Product |

The reason that the above transformation process can be established is that the phenol consumed during esterification can be regained as a by-product during polycondensation. The theoretical consumption of phenol is only 1/n of the input, and this phenol is consumed in polyester end group formation. Owing to the very high degree of polymerization of polyester in this invention, the value of n often reaches 200–500 as mentioned above.

Therefore, the practical consumption of phenol is very low and is equal to 1/200–500 input mole number. It is unavoidable that part of the p-hydroxybenzoic acid will remain after esterification and this remaining p-hydroxybenzoic acid will undergo the following thermodecarboxylation side-reaction at high reaction temperature during polycondensation.

$$HO-\bigcirc-\overset{O}{\underset{\|}{C}}-OH \xrightarrow{Heat} HO-\bigcirc + CO_2\uparrow$$

The phenol gained in the side-reaction can compensate for the phenol consumed in forming the end group. Therefore, the equilibrium for phenol in the whole process can certainly be established and maintained and the ideal condition of no consumption of phenol during the whole process can actually be met. Thus, phenol is no longer used as a raw material but a transferring medium in the process. Phenol is only input into the system once. It can be used repeatedly for many times and need not be refilled for loss. The following distinguishing features constitute the fundamental technical characterization of this invention, with the only starting material (i.e., the only reagent which must be replenished) being hydroxybenzoic acid, with the help of the intermediate transformation of phenol and by means of esterification, the hydroxybenzoic acid polyester resins of a high degree of polymerization can directly be obtained by polycondensation. There is actually no consumption of the transferring medium phenol during the whole process; it can be used repeatedly. This invention is carried out in the following steps:

Hydroxybenzoic acid first esterifies with an excess amount of phenol in the presence of a catalyst. The excess phenol is distilled, then without separation and purification the reaction mixture undergoes polycondensation directly after the solvent and catalyst for polycondensation are added. The polyester is obtained directly from polycondensation. All the phenol-containing distillates except the water layer condensate of the esterification are collected which will include the phenol layer condensate of the esterification distillate, the distilled excess phenol and the distillate of the polycondensation. No new phenol is required and the phenol containing distillates are used directly. This phenol reacts with the newly added hydroxybenzoic acid and another round of esterification and polycondensation will go on.

Then the new hydroxybenzoic acid polyester resins and phenol containing distillates mixture are obtained and the above process is repeated.

The water layer condensate of the esterification distillate contains a small amount of phenol. If water in this condensate is not removed, the large quantity of water present in this condensate will seriously affect the next round esterification. This is the reason why the water layer condensate of the esterification distillate cannot join the transformation cycle. The elimination of this condensate will not affect the phenol equilibrium. According to the above measures of implementation, the technical conditions applicable are:

As mentioned above, the most useful p-hydroxybenzoic acid isomer is the raw material of this invention; obviously ortho-, meta- or other benzene ring substituted hydroxybenzoic acids can also be used, but the heat-resistant properties of these polyesters will be degraded significantly. In this invention, phenol is used as the transferring medium of the process. It is cheap and easy to get. Other substituted phenols such as halogen, alkyl- or alkoxyl phenol and the like can also be used. When phenol is used, the decarboxylation side-reaction of hydroxybenzoic acid can be made use of, the phenol equilibrium of the process can be maintained without any compensation of phenol and the structure of the polyester will be monomeric, while with the use of the substituted phenols this will not be the case.

In order to raise the percentage of esterification, in this invention, the esterification is carried out in the presence of excess amount of phenol. The mole ratio of phenol to hydroxybenzoic acid should be greater than one, the most preferred mole ratio is 3–8. This reaction is carried out at 120°–250° C., preferably 150–220° C. In this invention water is eliminated, by means of azeotropic distillation of the water-phenol mixture, but as is commonly known, other methods, such as simple distillation and azeotropic distillation by adding benzene, toluene or xylene, can also be used to eliminate water.

Sulfuric acid or derivatives of sulfonic acid including halogen, aliphatic group substituted and aryl sulfonic acid and mixtures thereof can be selected as the esterification catalyst. The most preferred is sulfuric acid, the quantity used being 0.001–0.1% of the total reactants in weight. In general, the time for esterification is 2–10 hr, preferably 2–5 hr. When more catalyst is added, the preferred time can even be decreased to 1–2 hr.

Bulk melting polycondensation may be used for this polycondensation, but it is better to carry out polycondensation in a certain solvent. In solution polycondensation, the reaction temperature is easier to control. In general, any organic solvent in which the reactants are soluble but the product is insoluble with a sufficiently high boiling point, which does not interfere in the polycondensation can be used as a solvent of the polycondensation. As far as solvent selection is concerned, factors such as price, toxicity, temperature-viscosity property and ease of removal should not be neglected. Solvents like polychlorobiphenyl, hydropolydiphenyl, polybenzyl or benzyl substituted alkylbenzene mixture or polyarylether and mixtures thereof can be used, but polybenzyl or benzyl substituted toluene mixture is preferred. The quantity of solvent used is 1 mole hydroxybenzoic acid/100–1000 ml, preferably 200–500 ml.

This polycondensation may go on without adding catalyst, but in the presence of suitable catalyst this reaction will go on better. The following compounds can be chosen as catalysts: butyltitanate, phenyltitanate and their derivatives and many organo-tin compounds such as $(C_4H_9)_2SnO$, $(C_4H_9)_3SnOH$, and $(C_4H_9)_4Sn$ and the mixtures thereof. The preferred catalyst is butyltitanate, the quantity used is 0.001–0.01% mole/per mole hydroxybenzoic acid.

The rate of polycondensation and the degree of polymerization will rise as the temperature of polycondensation is increased. The heat resistance of the polymer will be improved incrementally as the degree of polymerization is raised gradually. Hence the rate of raising the polycondensation temperature depends on the heat resistance of the polymer at lower degrees of polymerization. In general, uniform raising of temperature is adopted until the highest polycondensation temperature is reached. Then temperature is maintained for a certain time for the completion of the polycondensation. Usually a rate of 0.1°–10° C./min is adopted, the preferred rate is 0.5°–5° C./min. The highest polycondensation temperature depends on the heating ability of the heating equipment and also on the boiling point of the solvent used. Usually a temperature of 330°–430° C. is used, the preferred temperature is 350°–400° C. The length of time for maintaining the temperature depends on the highest temperature selected; the higher the temperature, the shorter the temperature maintaining period required with even no maintaining period; the lower the temperature, the longer the temperature maintaining period with even more than 10 hr.

No obvious harmful effect is observed when the reaction system is not protected by inert gases. However, the reaction of this invention is carried out under nitrogen gas protection in order to suppress oxygenation under high temperature and to promote distillation of low molecular compound. Similarly, this reaction may take place conveniently under atmospheric pressure, but distillation of low molecular compound will be facilitated under suitably reduced pressure.

In this invention, the polycondensation product is rinsed continuously in special equipment by a detergent in order to remove thoroughly any adhered polycondensation solvent from the product after the end of polycondensation. This detergent is selected from those low alkylketones, benzene or alkylbenzene and various kinds of hydrocarbons which have good solubility with polycondensation solvents, appropriate boiling point and viscosity and can be removed thoroughly from the product during drying. Usually one or several above-mentioned compounds are used. The preferred detergent is acetone which can be recovered by distillation.

The number average molecular weight of the polyester is determined by the end group analysis in this invention. In the polyester produced according to the process of this invention, the number average molecular weight of the polymer obtained is usually in the range of 20000°–60000. The bending strength of the moulding product will be higher than 50 MPa if the number average molecular weight is greater than 9000, the higher the molecular weight, the higher the bending strength.

Thermogravimetric analysis (TGA) was carried out in atomosphere with 5° C./min uniform temperature rise. The weight loss percentage of polyester made in this invention is less than 1% at 450° C. and less than 5% at 500° C. When a nonstandard high temperature oven with rotary sample tray is used, per hour weight loss percentage determined at 400° C. constant air temperature stream is usually less than 2% and not greater than 3% at most. Therefore the polyester obtained by this invention has a series of excellent properties as mentioned before.

The technical-economical advantages of this invention are:

(1) Simple raw material, i.e. hydroxybenzoic acid polyester resins with a high degree of polymerization can be obtained directly with only one starting material which must be replenished, i.e., hydroxybenzoic acid. Hence the manufacturing cost of the product may be decreased greatly. For example, as compared with the above-mentioned ester exchange of diphenyl carbonate, half of the raw material cost can be cut down due to complete saving of diphenyl carbonate.

(2) The troublesome task of treating a large amount of various phenol-containing distillates encountered in various exchange methods using phenyl hydroxybenzoate as the polycondensation monomer can be totally solved. The phenol-containing distillate obtained in this invention acts as a transfer medium for this process. The distillate may directly and recurrently be used in the esterification without any kind of purification. It will not affect the esterification and polycondensation reactions and also the properties of the polyester. The useful raw material (hydroxybenzoic acid) and the monomer (phenyl hydroxybenzoate) contained in the distillate can be recovered during the circulation process of the distillates and can finally be transformed to hydroxybenzoic acid polyester resins, increasing the yield of polyester consequently. This advantage can also be used for further increasing the yield of polyester to the level of about 90%.

(3) The degree of polymerization of the polyester obtained in this invention is higher, usually 200–500. The number average molecular weight reaches 20000–60000. It is about 2–5 times the number average molecular weight 8000–12000 of the polyester obtained by the ester exchange process using diphenyl carbonate. Therefore the heat-resistance characterized by DTA and TGA, the crystallinity characterized by X-ray diffraction analysis and the mechanical properties of the mould pressed product including bending, compression, impact and abrasion resistance of the polyester obtained in this invention are comparatively better.

(4) There are no or few problems of tough, consuming byproduct recovery or environmental pollution such as gas, liquid and solid wastes.

To further illustrate the specific procedure and process, the following examples are provided.

EXAMPLE 1

To a 1000 ml three necked bottle equipped with a stirrer, a thermometer, a nitrogen inlet and a distillation tube, 142 gm industrially pure (97%) p-hydroxybenzoic acid, 46 gm simple distilled industrially pure phenol and 0.1 gm chemically pure (98%) sulfuric acid were added and heated. The reaction mixture under the protection of nitrogen was heated to 186° C. with stirring. The top temperature of the distillation tube was kept at not lower than 100° C. The water and phenol formed were distilled out together in the form of azeotropic mixture through a condenser and introduced into an accepter. After three hours the water and phenol condensates were divided into two layers. The water content reached 16.8 gm, and was separated out. The excess phenol was distilled off from the reaction product mixture. 375 ml dibenzyltoluene and 0.018 gm butyl titanate were added. Temperature was raised at a rate of 1° C./min to 390° C. and was maintained for 1.5 hr to complete the polycondensation. 940 gm phenol-containing distillate mixture was collected. The product was separated and the adhered polycondensation solvent on the product was thoroughly rinsed away with acetone by a Soxhlet fat extraction apparatus (or other washing equipment). 97.1 gm light yellow color, particle size <70 mesh polybenzoate was obtained after drying, the yield of which calculated from the input of the p-hydroxybenzoic acid was 80.9%. The number average molecular weight determined by end group analysis was 38,300 and the 1 hr weight loss at 400° C. was 1.21%.

EXAMPLE 2

The reaction equipment was the same as in example 1. 948 gm phenol-containing distillate mixture, 142 gm p-hydroxybenzoic acid and 0.1 gm sulfuric acid were added one after another. Esterification using the same procedure as in example 1 was carried out. 21.3 gm of water formed after 3 hrs. The water layer was separated and the excess phenol was distilled off. Polycondensation was completed by the same procedure as example 1. 978 gm phenol containing distillate and 103.2 gm light yellow colored, particle size <70 mesh polybenzoate obtained. The yield was 86.0%, number average molecular weight was 45800 and 1 hr weight loss was 1.3% at 400° C.

EXAMPLE 3

With reaction equipment the same as in example 1, 870 gm phenol-containing distillate mixture obtained from the 9th round transformation which followed the same procedure as example 2 (only a part of it was added since the bottle would be too full otherwise), 142 gm p-hydroxybenzoic acid and 0.1 gm sulfuric acid were added to the bottle. The 10th round transformation was then completed in the same manner as in example 2. 884 gm phenol-containing distillate mixture, 104.2 gm light yellow colored, particle size <70 mesh polybenzoate were obtained. The yield was 86.8%, number average molecular weight was 52900 and 1 hr. weight loss was 0.93% at 400° C. The results of the thermogravimetric analysis (sample weight 200 mg, rate of rise of 5° C./min, air medium) by Japanese OTK type automatic recording thermobalance were as follows:

| Heating Temperature °C. | Weight loss percentage % |
| --- | --- |
| 437 | weight loss began |
| 468 | 1 |
| 483 | 2 |
| 506 | 5 |
| 515 | 10 |
| 640 | 95 |

From the reported yield and the properties of the polyester it was proved that after 10 rounds of the reaction, the above transformation reaction still went on quite normally.

What is claimed is:

1. A process for preparing hydroxybenzoic acid polyester resins with a high degree of heat resistance and a high degree of polymerization comprising the steps of
   preparing phenyl hydroxybenzoate monomer by esterifying hydroxybenzoic acid with phenol, the mole ratio of phenol to hydroxybenzoic acid being greater than one to ensure an excess amount of phenol,
   said esterification being conducted at a temperature from about 120°–250° C. for a period of about 1–10 hours in the presence of an esterification catalyst present in an amount of about 0.0001–0.1% based upon total weight of reactants, said catalyst being selected from the group consisting of sulfuric acid, sulfonic acid derivatives, or mixtures thereof;
   distilling the reaction mixture to remove phenol and water;
   discarding the water;
   polymerizing said monomer by a polycondensation reaction to form said polyester resin,
   said polycondensation reaction being conducted in the presence of (a) a polycondensation catalyst in the amount of about 0.0001–0.01 mole % per mole of hydroxybenzoic acid selected from the group consisting of butyltitanate, phenyltitante, organotin compounds or their derivatives, or mixtures thereof, and (b) a polycondensation solvent in the amount of about 100–1000 ml per mole of hydroxybenzoic acid selected from the group consisting of polychlorobiphenyl, hydroxypolydiphenyl, mixtures of polybenzyl or benzyl-substituted alkylbenzenes, polyarylethers, or mixtures thereof at a temperature no higher than about 330°–430° C. which is reached by raising the reaction temperature at a rate of about 0.1°–10° C./min.;
   distilling off the phenol generated as a by-product of said polycondensation reaction and combining it with the phenol distillates collected after the esterification reaction; and
   combining all the phenol distillates with additional hydroxybenzoic acid to prepare additional monomer for further polycondensation reaction to produce polyester.

2. The process of claim 1 wherein the mole ratio of phenol to hydroxybenzoic acid is about 3–8.

3. The process of claim 1 wherein said esterification catalyst is sulfuric acid.

4. The process of claim 1 wherein said esterification reaction is conducted at a temperature of about 150–220° C.

5. The process of claim 1 wherein said esterification reaction is conducted for a period of about 2-5 hours.

6. The process of claim 1 wherein said polycondensation solvent is a mixture of polybenzyl or benzylsubstituted toluene and is present in an amount of about 200-500 ml/mole hydroxybenzoic acid.

7. The process of claim 1 wherein the temperature during said polycondensation reaction is raised at a rate of about 0.5°-5° C./min.

8. The process of claim 1 wherein said polycondensation reaction is conducted at a temperature no higher than about 350°-400° C.

UNITED STATES PATENT AND TRADEMARK OFFICE
CERTIFICATE OF CORRECTION

PATENT NO. : 5,006,632

DATED : April 9, 1991

INVENTOR(S) : Renxian Duan, et al

It is certified that error appears in the above-identified patent and that said Letters Patent is hereby corrected as shown below:

Col. 1, line 19, "orth-" should be --ortho-, --.

Col. 4, line 54, after "completed", insert --to form a monomer phenyl hydroxybenzoate for further--.

Col. 9, line 11, "46gm" should be --846gm--.

Col. 9, line 51, "1.3%" should be --1.13%--.

Signed and Sealed this

Sixteenth Day of February, 1993

Attest:

STEPHEN G. KUNIN

Attesting Officer

Acting Commissioner of Patents and Trademarks